(12) United States Patent
Jin

(10) Patent No.: US 6,964,267 B2
(45) Date of Patent: Nov. 15, 2005

(54) DIESEL FUEL SUPPLY SYSTEM FOR PREVENTING FUEL PRESSURE LOSS

(75) Inventor: Jeong-Sik Jin, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/980,908

(22) Filed: Nov. 3, 2004

(65) Prior Publication Data
US 2005/0092304 A1      May 5, 2005

(30) Foreign Application Priority Data
Nov. 4, 2003    (KR) ............. 10-2003-0077546

(51) Int. Cl.⁷ .................................. F02M 31/00
(52) U.S. Cl. .............. 123/514; 123/446; 123/557; 123/179.17
(58) Field of Search ............. 123/514, 516, 123/510, 446, 557, 179.17

(56) References Cited

U.S. PATENT DOCUMENTS

| | | | | |
|---|---|---|---|---|
| 4,432,329 A | * | 2/1984 | Redele ................... | 123/557 |
| 4,440,138 A | * | 4/1984 | Smith .................... | 123/557 |
| 4,454,851 A | * | 6/1984 | Bourbonnaud et al. ..... | 123/557 |
| 4,481,931 A | * | 11/1984 | Bruner ................... | 123/557 |
| 4,502,450 A | * | 3/1985 | Duprez ................... | 123/516 |
| 4,502,451 A | * | 3/1985 | Duprez ................... | 123/516 |
| 4,553,697 A | * | 11/1985 | Nothen et al. ........... | 237/12.3 B |
| 4,574,762 A | * | 3/1986 | Muller et al. ........... | 123/510 |
| 4,893,603 A | * | 1/1990 | Siebels .................. | 123/514 |
| 4,984,554 A | * | 1/1991 | Ariga et al. ............ | 123/516 |
| 5,832,902 A | * | 11/1998 | Davis et al. ............ | 123/514 |
| 6,615,806 B2 | * | 9/2003 | Schueler ................. | 123/514 |

OTHER PUBLICATIONS

Patent Abstracts of Japan, Publication No. 07-127515, May 1995.

* cited by examiner

Primary Examiner—Weilun Lo
(74) Attorney, Agent, or Firm—Peter F. Corless; Edwards & Angell, LLP

(57) ABSTRACT

Diesel engine fuel supply systems are provided that are preferably adapted to reduce fuel pressure loss. Preferred fuel supply systems comprise a fuel supply line for providing fuel from a fuel tank to a fuel injector through a prime pump and fuel filter. A first fuel return line is configured to return the residual fuel in the fuel injector to the fuel tank. A second fuel return line is configured to return the residual fuel in the fuel injector to the fuel filter. A heater heats up the fuel passing through the second fuel return line. A bypass line is suitably equipped to directly provide the fuel to the fuel injector through the fuel filter without passing through the prime pump.

2 Claims, 3 Drawing Sheets

DIESEL FUEL SUPPLY SYSTEM FOR PREVENTING FUEL PRESSURE LOSS

CROSS-REFERENCE TO RELATED APPLICATIONS

The present application is based on, and claims priority from, Korean Application Serial No. 10-2003-0077546, filed on Nov. 04, 2003, the disclosure of which is hereby incorporated by reference herein in its entirety.

FIELD OF THE INVENTION

The present invention relates to a fuel supply system for an automotive diesel engine adapted to reduce fuel pressure loss.

BACKGROUND OF THE INVENTION

Generally, vehicles are classified according to their body styles such as passenger vehicles, commercial vehicles (bus, trucks, etc.) and the like. Vehicles are also categorized according to the type of fuel used in the automobiles, e.g., gasoline engine vehicles, diesel engine vehicles, or Liquefied Petroleum Gas (LPG) engine vehicles.

In order to generate engine power in diesel engine vehicles, fuel is injected under high pressure (around 100–300 atmospheric pressures) into the combustion chamber filled with compressed air under about 40 atmospheric pressures at 500–550° C. That is, the injected fuel is self-ignited by the compressed heat of air and converts thermal energy into mechanical energy for use as diesel fuel.

Since the fuel injection pressure of the diesel engine is very high, it can be important to maintain a sufficient fuel pressure until the fuel pumped from the fuel tank is injected into the injector. Thus, a proper fuel supply pressure should be maintained at all times to readily deliver fuel to the combustion chamber even when the vehicles accelerates rapidly.

A fuel supply system for diesel engine vehicles is typically designed to pump fuel from a fuel tank, heat the fuel at a desired temperature and then inject it through an injector after passing through a filter. However, this causes an inevitable fuel pressure loss at about 360 mbar while the fuel passes through each of the above components despite an initial high fuel supply pressure.

Additionally, when the fuel pressure loss is about 360 mbar in such a diesel engine fuel supply system, the amount of loss typically increases over time.

Such excessive fuel pressure loss can pose notable problems. Thus, when the fuel pressure loss is about 360 mbar or more in the fuel supply system, a proper fuel supply may not be provided during rapid acceleration, thus deteriorating the engine operation of a vehicle. Additionally, if the fuel pressure loss is about 360 mbar or more, then a controller may make an erroneous determination for an inlet metering valve that regulates the fuel pressure.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the invention provide systems and methods to reduce fuel supply pressure loss to about 300 mbar or less for a diesel engine fuel supply system, thereby stabilizing a fuel supply and preventing or minimizing an erroneous determination for various apparatus associated with fuel pressure.

In a preferred aspect, the invention includes a diesel engine fuel supply system that reduces fuel pressure loss and which includes a fuel supply line for providing fuel from a fuel tank to a fuel injector through a prime pump and fuel filter. A first fuel return line is suitably configured to return the residual fuel in the fuel injector to the fuel tank. A second fuel return line is suitably configured to return the residual fuel in the fuel injector to the fuel filter. A heater heats fuel passing through the second fuel return line. A bypass line is presferably employed and is equipped to directly provide the fuel to the fuel injector through the fuel filter without passing through the prime pump.

Preferably, the fuel filter is equipped with a temperature-adjusting valve that provides fuel to the fuel filter after heating via the heater if the temperature of the fuel provided through the fuel supply line is less than or equal to a standard value.

The bypass line is preferably equipped with a check valve to induce fuel to flow only from the fuel tank toward the fuel filter.

The invention also includes vehicles that comprise a fuel supply system as disclosed herein. In particular aspects, the invention includes diesel engine motor vehicles, such as an automobile, truck, bus or the like that includes a diesel engine and that comprises a fuel supply system as disclosed herein.

It is understood that the term "vehicle" or other similar term as used herein is inclusive of motor vehicles in general such as passenger automobiles, buses, trucks, various commercial vehicles, watercraft, aircraft, and the like.

Other aspects of the invention are discussed below.

BRIEF DESCRIPTION OF THE DRAWINGS

For a better understanding of the nature and objects of the present invention, reference should be made to the following detailed description with the accompanying drawings, in which.

DETAILED DESCRIPTION OF THE INVENTION

Figure 1:
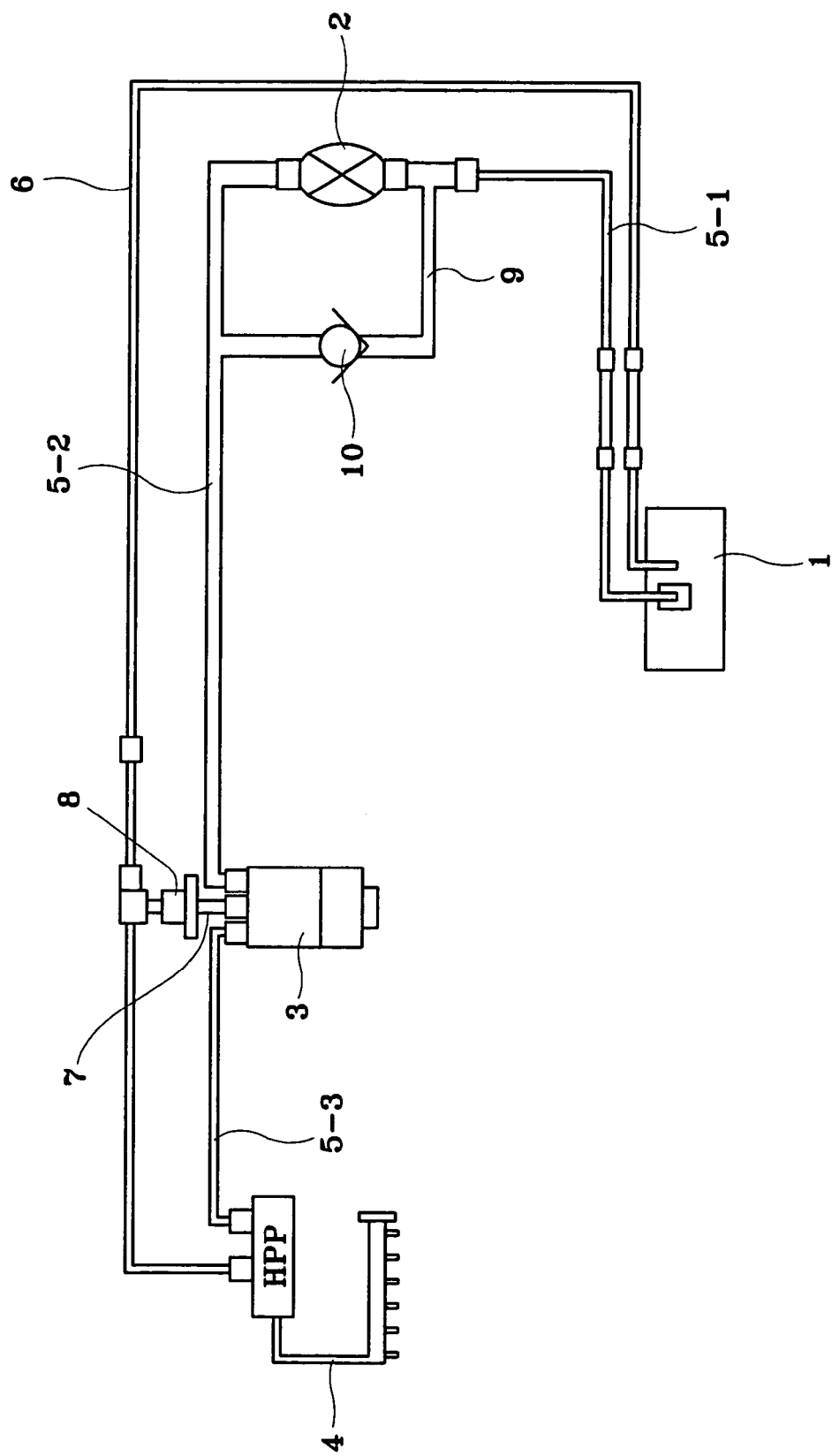
FIG. 1 is a block diagram of a diesel engine fuel supply system adapted to reduce the fuel pressure loss according to an embodiment of the present invention.

Referring now specially to FIG. 1, a fuel supply system according to an embodiment of the present invention comprises fuel supply lines 5-1, 5-2, and 5-3 for providing fuel from a fuel tank 1 to a fuel injector 4 through a prime pump 2 and fuel filter 3. A first fuel return line 6 is configured to return the residual fuel in the fuel injector 4 to the fuel tank 1. A second fuel return line 7 is configured to return the residual fuel in the fuel injector 4 to the fuel filter 3. A heater 8 heats up the fuel passing through the second fuel return line 7. A bypass line 9 directly provides fuel from the fuel tank 1 to the fuel injector 4 through the fuel filter 3 without passing through the prime pump 2.

The prime pump 2 suitably operates when initially starting the engine or cleaning out the fuel filter 3. Therefore, the prime pump 2 constituting the fuel supply line suitably does not operate under a normal state of engine operation.

The fuel filter 3 suitably filters out impurities or moisture from fuel provided through the first and second fuel supply lines 5-1 and 5-2 or bypass line 9 and then provides the fuel to the fuel injector 4 through the third fuel supply line 5-3. The fuel injector 4 pressurizes fuel provided from the fuel tank 1 under high pressure e.g. by using a built-in High Pressure Pump (HPP) and then injects the fuel into the combustion chamber.

The fuel filter 3 is equipped with a mechanical temperature-adjusting valve (not shown) that provides fuel to the fuel filter 3 after heating via the heater 8 if the temperature of the fuel provided through the second fuel supply line 5-2 is less than or equal to a standard value (when the vehicle starts under cold conditions).

The bypass line 9 is mounted with a check valve 10 to induce the fuel to flow only from the fuel tank 1 toward the fuel filter 3.

The operation of the present invention will now be described in detail with the accompanying drawings.

Figure 2:
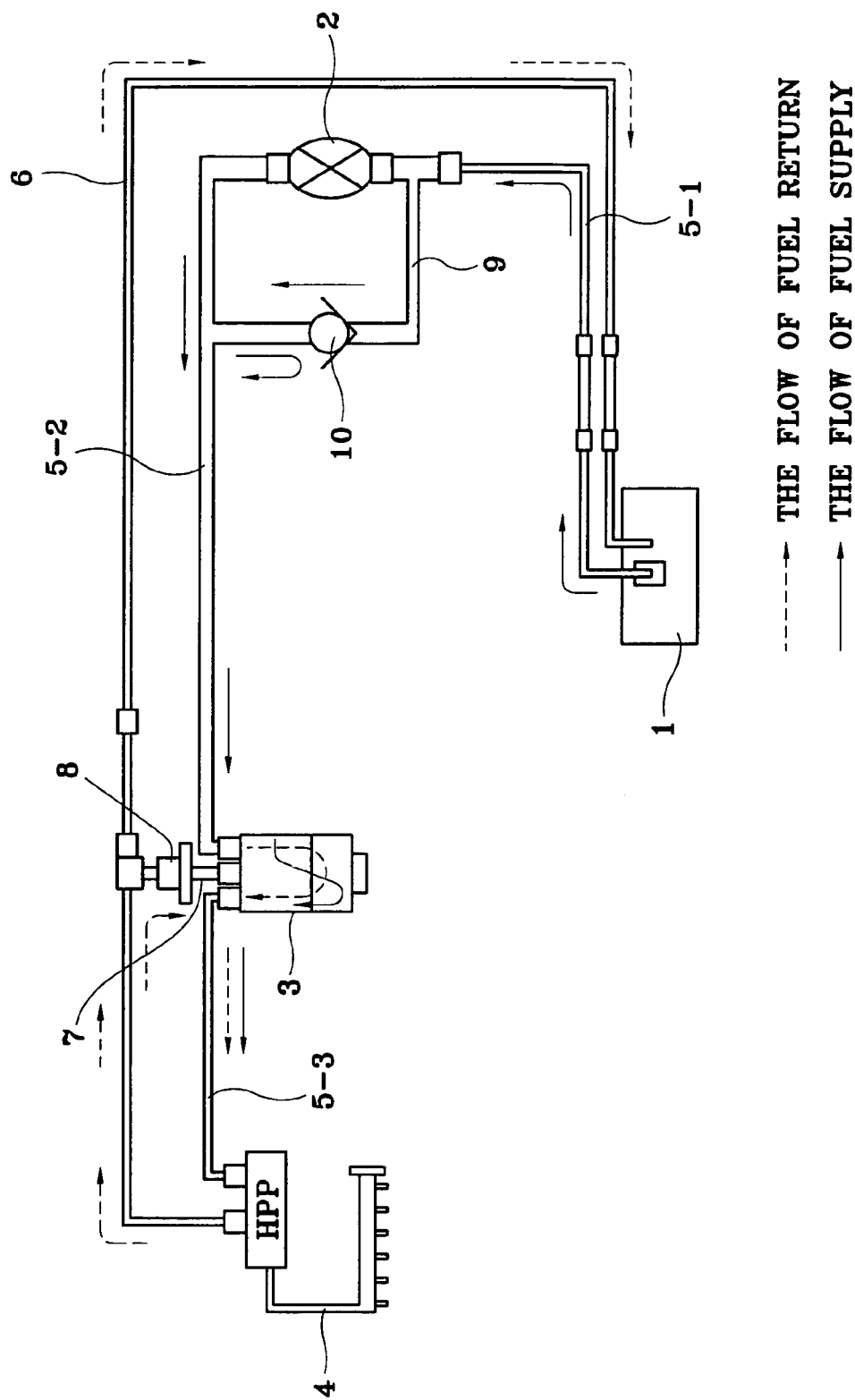
FIG. 2 illustrates the flow of fuel in a fuel supply system according to an embodiment of the present invention.

With reference to FIG. 2, when the prime pump 2 is in operation, the fuel stored in the fuel tank 1 is supplied to the fuel filter 3 through the first fuel supply line 5-1, prime pump 2 and second fuel supply line 5-2. When the prime pump 2 is not in operation, the fuel is supplied to the fuel filter 3 through the first fuel supply line 5-1, bypass line 9 and second fuel supply line 5-2.

The fuel filter 3 suitably traps any dirt particles (such as dust or the like) and water present in the provided fuel and provides the fuel to the fuel injector 4 through the third fuel supply line 5-3. The fuel injector 4 activates the engine by injecting the filtrated fuel into the combustion chamber under high pressure.

Fuel remaining within the fuel injector 4 is suitably returned to the fuel tank 1 through the first fuel return line 6. However, if the vehicle starts under cold conditions, the remaining fuel suitably flows through the second fuel return line 7 to be heated via the heater 8 and then is re-supplied to the fuel injector 4 through the fuel filter 3.

Figure 3:
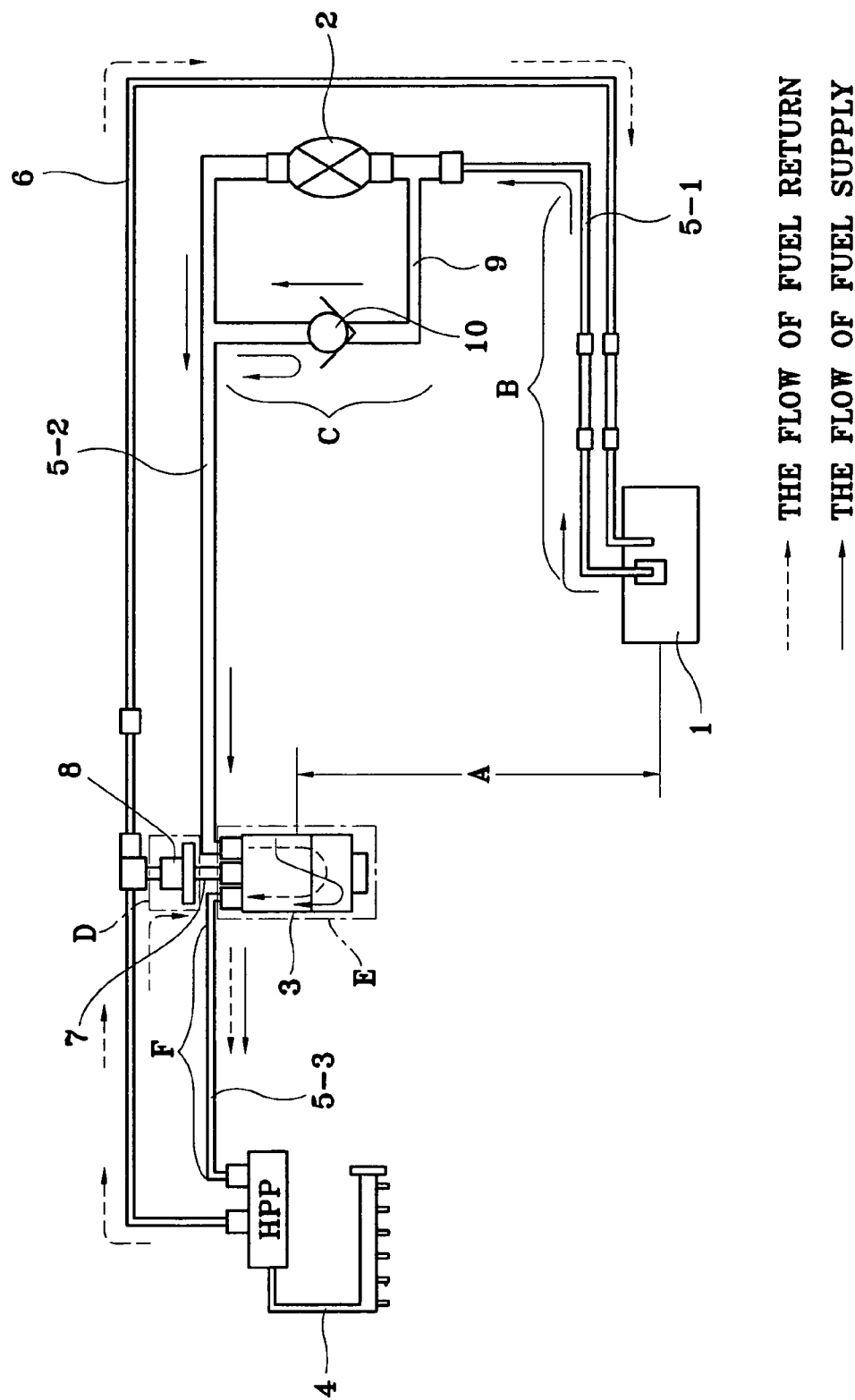
FIG. 3 depicts a fuel pressure loss in a fuel supply system according to an embodiment of the present invention.

The fuel pressure loss of the fuel supply system will now be described in detail with reference to FIG. 3.

The height differential (A: about 50 cm) between the fuel tank 1 and fuel filter 3 may decrease the fuel pressure by about 40 mbar, in which the fuel tank 1 is disposed at a lower portion of the vehicle and the fuel filter 3 is mounted at the engine.

The first fuel supply line 5-1 is located along the lower portion of the vehicle and runs from the fuel tank 1 toward the engine. The fuel pressure may decrease by about 46 mbar through B.

The fuel pressure may decrease approximately 115 mbar through C (bypass line 9 and check valve 10) while the fuel pressure may be reduced about 140 mbar through prime pump 2. However, as the bypass line and check valve 10 are used in the present invention, the fuel pressure can be increased by about 25 mbar.

Furthermore, the fuel pressure decreases about 5 mbar through D (heater 8 and the surrounding line thereof). However, 5 mbar denotes that almost no fuel pressure loss occurs compared to the fuel pressure loss by a conventional heater (about 72 mbar).

The heater 8 is not installed in the second fuel supply line 5-2 but preferably in the second fuel return line 7, thereby resulting in no fuel pressure loss through the heater 8. That is, the fuel required to be heated when cranking the engine under cold conditions is performed by the restoring fuel, thus preventing the fuel pressure loss due to the heater 8 that heats fuel provided from the fuel tank 1.

A fuel pressure loss of about 41 mbar may occur through E (fuel filter 3 and the surrounding line thereof) and about 27 mbar through F (third fuel supply line 5-3).

Consequently, about 67 mbar of the fuel pressure loss is prevented by installing the heater 8 in the second fuel return line 7 and about 25 mbar is saved by using the bypass line 9 and check valve 10. Therefore, the total fuel pressure loss in the embodiment of the present fuel supply system is expected to be about 274 mbar. That fuel pressure loss is less than 300 mbar, which is considered to be an acceptable limiting point of fuel pressure loss, and which can result in a normal engine operation and stabilization of the fuel supply.

As apparent from the foregoing, there is an advantage in that the fuel pressure loss is maintained at about 300 mbar or less in the fuel supply system, thereby effectively preventing any impediments of fuel delivery occurring when the fuel pressure loss deviates from a predetermined range due to a rapid acceleration.

Additionally, substantially constant maintaining of fuel pressure loss at about 300 mbar or less can prevent faulty determination in relation to a fuel-pressure adjusting valve or the like, which also can result in a safe and effective engine operation.

While the invention has been described with reference to specific embodiments, modifications and variations of the invention may be constructed without departing from the scope of the invention, which is defined in the following claims.

What is claimed is:

1. A fuel supply system for reduced fuel pressure loss in a diesel engine vehicle, comprising:
   a fuel supply line for providing fuel from a fuel tank to a fuel injector through a prime pump and a fuel filter;
   a first fuel return line configured to return the residual fuel in the fuel injector to the fuel tank;
   a second fuel return line configured to return the residual fuel in said fuel injector to the fuel filter; and
   a heater to heat up the fuel passing through the second fuel return line,
   wherein the second fuel return line is divided from the first fuel return line and directly connected to the fuel filter, and the heater is installed only on the second fuel return line.

2. A diesel engine motor vehicle comprising a fuel supply system of claim 1.

* * * * *